US010836369B1

(12) United States Patent
Hwang et al.

(10) Patent No.: US 10,836,369 B1
(45) Date of Patent: Nov. 17, 2020

(54) ELECTRIC BOOSTER HAVING FORCE-FEEDBACK-CONTROL STRUCTURE

(71) Applicants: Hyundai Motor Company, Seoul (KR); Kia Motors Corporation, Seoul (KR)

(72) Inventors: Se-Ra Hwang, Gyeonggi-do (KR); Jae-Hun Shim, Gyeonggi-do (KR); Joung-Hee Lee, Gyeonggi-do (KR); Gab-Bae Jeon, Gyeonggi-do (KR); Yong-Pil Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/690,858

(22) Filed: Nov. 21, 2019

(30) Foreign Application Priority Data

May 20, 2019 (KR) .......................... 10-2019-0058980

(51) Int. Cl.
  *B60T 7/04* (2006.01)
  *B60T 13/74* (2006.01)
  *B60T 8/171* (2006.01)
(52) U.S. Cl.
  CPC ............ *B60T 13/745* (2013.01); *B60T 7/042* (2013.01); *B60T 8/171* (2013.01)
(58) Field of Classification Search
  CPC ......... B60T 7/042; B60T 8/171; B60T 13/745
  USPC .......................................................... 60/545
  See application file for complete search history.

(56) References Cited

U.S. PATENT DOCUMENTS

| 9,037,374 | B2 * | 5/2015 | Foitzik .................. | B60T 13/575 |
| | | | | 701/70 |
| 9,428,169 | B2 * | 8/2016 | Zhang ................... | B60T 13/745 |
| 2014/0265545 | A1 * | 9/2014 | Yang ...................... | B60T 13/588 |
| | | | | 303/14 |
| 2017/0253225 | A1 | 9/2017 | Lopez | |
| 2018/0370515 | A1 * | 12/2018 | Kim ...................... | B60T 13/686 |

FOREIGN PATENT DOCUMENTS

| CN | 105799678 A | 7/2016 |
| CN | 103950443 B | 8/2016 |
| KR | 10-2014-0109277 A | 9/2014 |
| KR | 101601462 B1 | 3/2016 |
| KR | 10-2017-0118524 A | 10/2017 |
| WO | 2011/0144378 A1 | 11/2011 |

* cited by examiner

*Primary Examiner* — Thomas E Lazo
(74) *Attorney, Agent, or Firm* — Mintz Levin Cohn Ferris Glovsky and Popeo, P.C.; Peter F. Corless

(57) ABSTRACT

An electric booster is provided having a force-feedback-control structure. The electric booster includes a master piston having a nut unit rectilinearly moved in a booting cylinder space by receiving driving power generated by a motor and a hydraulic pressure generated by a pedal effort. A first screw has a first end connected to the motor and a second end extending into the boosting cylinder, and is rotated by the motor operating with the brake pedal. A second screw is disposed to face the first screw to have a separation space. A connecting member connects the first screw and the second screw. A pressure balancing member has contact surfaces in contact with the second end of the first screw and the connecting member, respectively, and is deformed by a difference between two pressures when applied to the contact surfaces in a longitudinal direction of the first screw, respectively.

12 Claims, 9 Drawing Sheets

ELECTRIC BOOSTER HAVING FORCE-FEEDBACK-CONTROL STRUCTURE

CROSS-REFERENCE TO RELATED APPLICATION

This application claims priority under 35 U.S.C. § 119 to Korean Patent Application No. 10-2019-0058980, filed on May 20, 2019, the disclosure of which is incorporated herein by reference in its entirety.

BACKGROUND

1. Field of the Invention

The present invention relates to an electric booster having a force-feedback-control structure, and more particularly, to an electric booster having a force-feedback-control structure capable of adjusting a pressure balance by receiving pressure feedback from the outside of a cylinder and comparing a pedal effort applied to a brake pedal and a force generated by a motor.

2. Description of the Related Art

Typically, in an electric booster-type braking system, when a driver engages a brake pedal, a pedal effort sensor detects a pedal effort of the driver (e.g., amount of force exerted onto the pedal), an electronic control unit (ECU) that operates a motor of a booster based on a measured value of the pedal effort sensor and transmits a boosted force to a master cylinder. The master cylinder transmits a braking pressure to a wheel brake based on the boosted force transmitted from a reciprocating motion of a master piston.

Then, an electronic stability control (ESC) device for a vehicle adjusts hydraulic pressure to be applied to the wheel brake based on braking modes to perform an appropriate braking operation. However, when a pressure outside the master cylinder is changed due to a change in rigidity of a brake system, since the braking pressure transmitted by the master piston is unable to be appropriately transmitted to the wheel brake, a pressure balance between the pressure generated by the pedal effort applied to the brake pedal and the braking pressure applied to the wheel brake is adjusted. In particular, the driver is required to further engage the brake pedal to generate a desired braking force, and as a result, there occurs non-uniformity in braking.

In the related art, a system has been developed in which an electronic control unit calculates a braking pressure using a detection result of a pedal stroke sensor and adjusts a braking force by moving a piston in a pump to meet the braking pressure.

In other words, a motor is rotated to position the piston at a first position calculated using a braking pressure, which is calculated by detecting a manipulation degree of a brake pedal, and information regarding piston positions which are listed in a lookup table and match with the braking pressure, the braking pressure is compared with a fluid pressure measured by a pressure sensor, and the motor is rotated corresponding to a difference between the braking pressure and the fluid pressure.

SUMMARY

The present invention provides a new type of invention that adjusts a pressure balance in a way different from the related art.

An exemplary embodiment of the present invention provides an electric booster having a force-feedback-control structure and the electric booster may include: a master piston having a nut unit; a boosting cylinder which provides a space in which the master piston may be moved rectilinearly by receiving driving power generated by a motor and a hydraulic pressure generated by a pedal effort applied to a brake pedal; a first screw which having a first end connected to the motor and a second end extending into the boosting cylinder, and may be rotated by the motor that operates in conjunction with the brake pedal; a second screw which is disposed to face the first screw so as to have a separation space and thread-coupled to the nut unit; a connecting member which connects the first screw and the second screw; and a pressure balancing member disposed to have contact surfaces in contact with the second end of the first screw and the connecting member, respectively, and deformed by a difference between two pressures when the two pressures are applied to the contact surfaces in a longitudinal direction of the first screw, respectively.

According to the present invention, it may be possible to actively adjust a pressure balance by receiving pressure feedback from the outside of the master cylinder, comparing the pedal effort applied to the brake pedal and the force generated by the motor, and then moving the first screw. Additionally, the separation space may be formed between the first screw and the second screw and thus, the state of the pressure balancing member may be changed when the pressure balance is changed, and the pressure balancing member in the normal state may be designed more easily.

According to the present invention, a gradient of the boost ratio, which is desired by the driver, may be maintained by changing the pedal effort applied to the brake pedal based on the deformed state of the pressure balancing member, and as a result, non-uniformity in braking may be minimized. Additionally, the third sensor may be configured to measure the deformed state of the pressure balancing member, and the motor may be automatically rotated, and thus, the boost ratio desired by the driver may be maintained, and as a result, non-uniformity in braking may be further minimized.

BRIEF DESCRIPTION OF THE DRAWINGS

A brief description of each drawing is provided to more sufficiently understand drawings used in the detailed description of the present invention.

DETAILED DESCRIPTION

Figure 1:
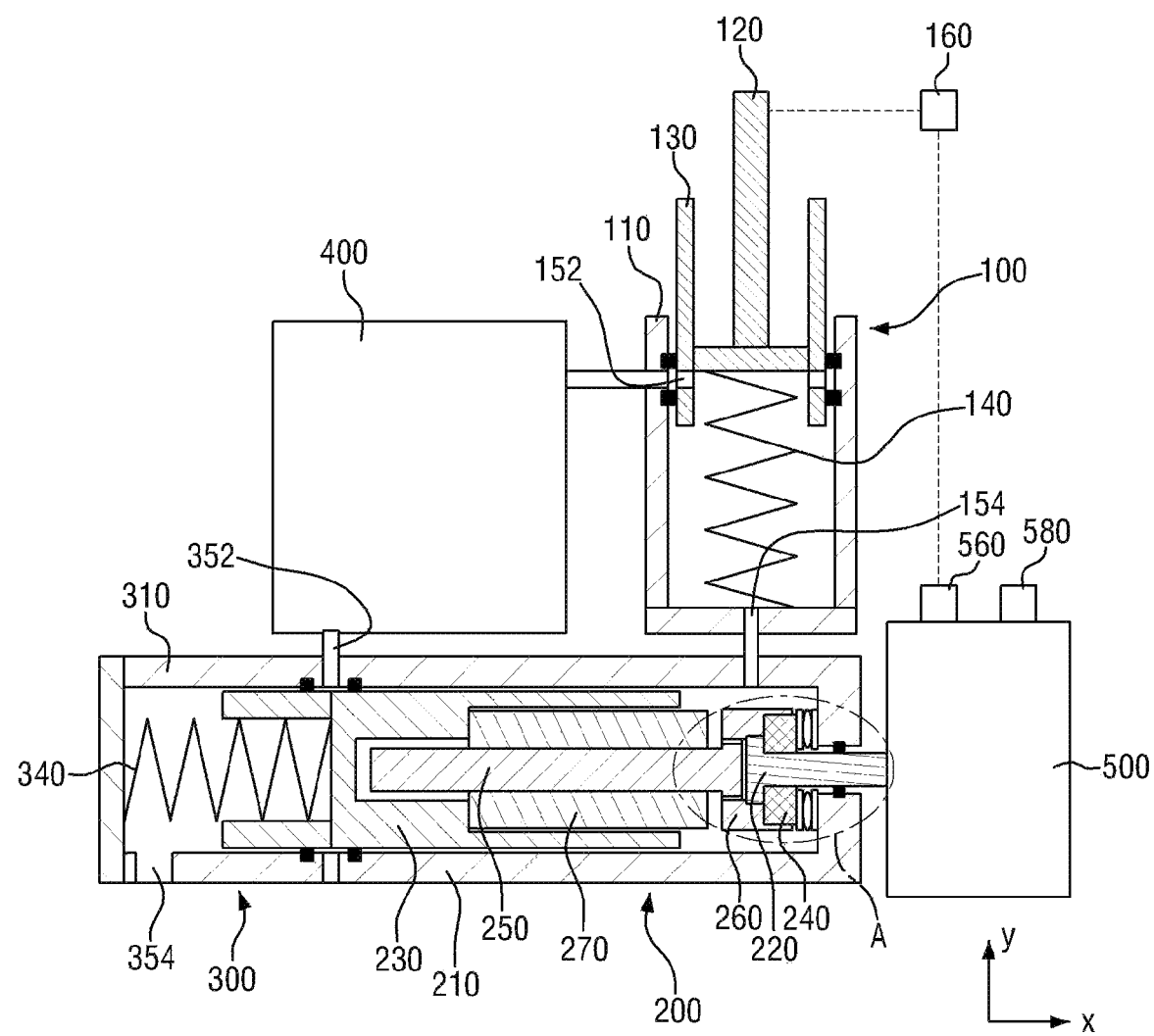
FIG. 1 is a view illustrating a schematic configuration of an electric booster having a force-feedback-control structure according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of an electric booster having a force-feedback-control structure according to the present invention will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term to describe his/her own invention by the best method.

Meanwhile, based on directions illustrated in the drawings in the present specification, an X direction includes a +X direction (right direction) and a −X direction (left direction), and a Y direction includes a +Y direction (up direction) and a −Y direction (down direction). As illustrated in FIG. 1, the electric booster having the force-feedback-control structure according to the exemplary embodiment of the present invention may include a pedal chamber unit 100, a boosting chamber unit 200, and a master chamber unit 300.

The pedal chamber unit 100 may include a pedal cylinder 110 which defines a space in which a hydraulic pressure is formed and generated by a pedal effort applied to a brake pedal, a push rod 120 which receives the pedal effort applied to the brake pedal, and a pedal piston 130 connected to the push rod 120, and a first return spring 140 which provides an elastic force to the pedal piston 130. A reservoir 400, which stores a hydraulic fluid, may provide the hydraulic fluid to the pedal cylinder 110 through a first connecting flow path 152 to thus provide the hydraulic fluid in the pedal cylinder 110.

When the pedal effort is applied to the brake pedal, the pedal piston 130 moves downward (in the −Y direction) to form a hydraulic pressure in the pedal cylinder 110. On the contrary, when the pedal effort applied to the brake pedal is removed, the pedal piston 130 is moved upward (in the +Y direction) by the first return spring 140, and thus, the hydraulic pressure formed in the pedal cylinder 110 may be removed.

Meanwhile, the pedal chamber unit 100 may include a first sensor 160. The first sensor 160 may be configured to measure a manipulation degree of the brake pedal by the driver and may be configured to convert an output voltage into a depth to which the brake pedal is pushed, that is, a stroke value. The first sensor 160 may be configured to measure a movement displacement of the brake pedal, the push rod 120, or the pedal piston 130.

The boosting chamber unit 200 may include a boosting cylinder 210, a first screw 220, a pressure balancing member 240, a second screw 250, and a connecting member 260. The boosting cylinder 210 may be supplied with the hydraulic fluid from the pedal cylinder 110 through a second connecting flow path 154, and thus, the hydraulic fluid may be provided in the boosting cylinder 210. A motor 500 may be disposed at one side of the boosting cylinder 210, and driving power generated by the motor 500 may be transmitted into the boosting cylinder 210. The boosting cylinder 210 accommodates the first screw 220, the pressure balancing member 240, the second screw 250, and the connecting member 260.

Meanwhile, the motor 500 may include a second sensor 560. The second sensor 560 may be configured to measure a rotation angle of the motor 500 and convert an output voltage into a movement distance of a nut unit 270 to be described below. The second sensor 560 may be configured to operate in conjunction with the first sensor 160 and measure the rotation angle of the motor 500 which corresponds to the manipulation degree of the brake pedal which is measured by the first sensor 160.

A first end of the first screw 220 may be connected to the motor 500, and a second end of the first screw 220 may be positioned in the boosting cylinder 210. Therefore, the first screw 220 may be formed to penetrate one side surface of the boosting cylinder 210. An aperture through which the first screw 220 penetrates one side surface of the boosting cylinder 210 may be sealed to prevent the hydraulic fluid from leaking to the outside of the boosting cylinder 210 when the first screw 220 is inserted therein.

The first screw 220 may include a horizontal portion 222 formed in a longitudinal direction, and a vertical portion 224 which extends from the second end of the first screw 220 in a direction perpendicular to the horizontal portion 222. Bearings 290 may be provided at both sides of the horizontal portion 222 to support the first screw 220 and the rotation of the first screw 220. Therefore, the first screw 220 may move in the longitudinal direction (X direction), but the movement of the first screw 220 in a radial direction (Y direction) may be restricted by the bearings 290.

The pressure balancing member 240 may be made of a material that is deformed by a pressure and assumes a posture to surround the horizontal portion 222 of the first screw 220, and the pressure balancing member 240 may have a cylindrical shape to be rotated more easily. Therefore, when the first screw 220 rotates, the pressure balancing member 240 also rotates.

A part of a side surface (e.g., a first side surface) of the pressure balancing member 240 in the −X direction may be in contact with a first contact surface 242 which is a side surface at the second end of the first screw 220 in the +X direction, and the pressure balancing member 240 may be deformed in the X direction by a pressure. In particular, the first contact surface 242 refers to a part of a cross section of the vertical portion 224 except for a cross section of the horizontal portion 222. In addition, a second side surface of the pressure balancing member 240 may be positioned to be stationary and unable to move in the X direction.

The second screw 250 may be disposed in the longitudinal direction of the first screw 220, and the second end of the first screw 220 and a first end of the second screw 250 may be disposed face each other in a state in which the second end of the first screw 220 and first end of the second screw 250 are spaced apart from each other at a predetermined distance. The nut unit 270 may be thread-coupled to an outer circumferential surface of the second screw 250, and the nut unit 270 may move in the X direction when the second screw 250 rotates. The nut unit 270 may be in contact with the master piston 230 to help the master piston 230 to move in the X direction.

The connecting member 260 may connect and rotate the first screw 220 and the second screw 250 and may have a cylindrical shape to allow the connecting member 260 to accommodate the second end of the first screw 220, first end of the second screw 250, and the pressure balancing member 240, and the connecting member 260 may rotate more easily. Therefore, when the first screw 220 rotates, the second screw 250 also rotates.

Figure 2:
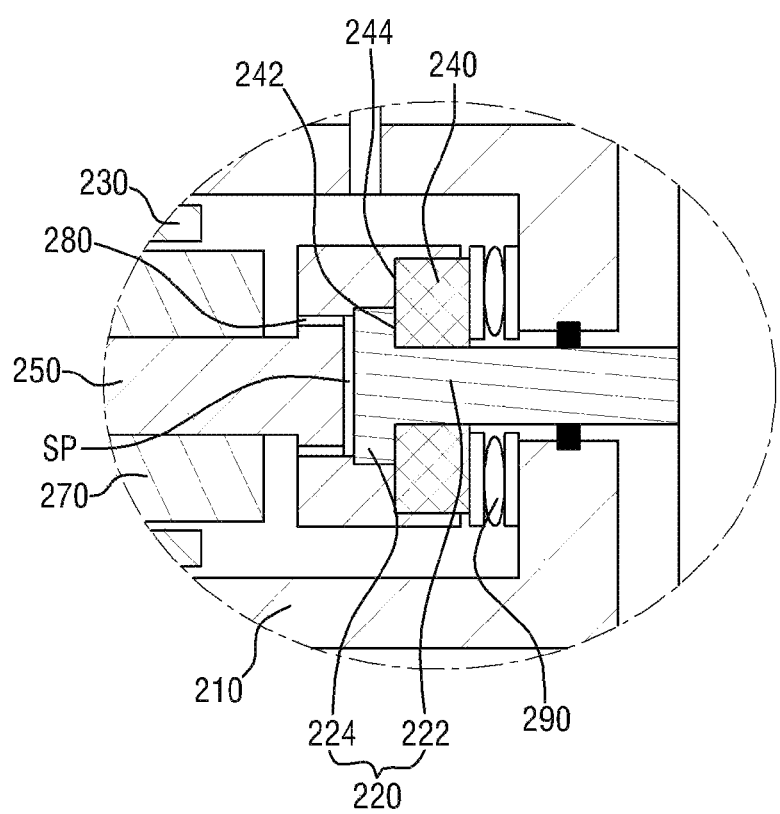
FIG. 2 is an enlarged view of part A in FIG. 1 according to an exemplary embodiment of the present invention.

As illustrated in FIG. 2, the second end of the first screw 220 and the first end of the second screw 250 maybe spaced apart from each other at a predetermined distance and accommodated in the connecting member 260, and thus, a separation space SP may be formed between the first screw 220 and the second screw 250. Particularly, the movement of the first screw 220 and the movement of the second screw 250 in the Y direction may be restricted, but the first screw 220 and the second screw 250 may freely move in the X direction, and thus, a size of the separation space SP may vary based on the movement of the first screw 220 and the movement of the second screw 250.

Meanwhile, a supply flow path 280 may be formed in the connecting member 260 to supply the hydraulic fluid to the separation space SP. The hydraulic pressure generated by the hydraulic fluid supplied to the separation space SP may vary based on the size of the separation space SP. In other words, the hydraulic pressure may be decreased as the size of the separation space SP is increased, and the hydraulic pressure may be increased as the size of the separation space SP is decreased.

A part of a side surface of the pressure balancing member 240 in the −X direction may be in contact with a second contact surface 244 which is a side surface of the connecting member 260 in the +X direction, and the pressure balancing member 240 may be deformed in the X direction by a pressure. In particular, the second contact surface 244 is a part of the side surface of the pressure balancing member 240 in the −X direction except for the first contact surface 242.

The master chamber unit 300 may be disposed at first side of the boosting chamber unit 200 and may include a master cylinder 310, which is a space in which a hydraulic pressure may be formed and generated by the movement of the master piston 230, and a second return spring 340. The reservoir 400, which stores the hydraulic fluid, may provide the hydraulic fluid to the master cylinder 310 through a third connecting flow path 352, and thus, the hydraulic fluid may be provided in the master cylinder 310. A portion between the master cylinder 310 and the boosting cylinder 210 may be sealed to prevent the hydraulic fluid from flowing between the master cylinder 310 and the boosting cylinder 210.

As described above, when the pedal effort is applied to the brake pedal and the driving power is generated by the motor 500 such that the master piston 230 moves in the −X direction, a braking pressure may be formed in the master cylinder 310. On the contrary, when the pedal effort applied to the brake pedal and the driving power generated by the motor 500 are removed, the master piston 230 may b moved in the +X direction by the second return spring 340, and thus, the braking pressure formed in the master cylinder 310 may be removed.

The hydraulic pressure formed in the master cylinder 310 may be transmitted through a fourth connecting flow path 354 to an electronic stability control (ESC) module for operating a brake or a caliper of the brake.

Meanwhile, as described above, the pedal effort applied to the brake pedal and the driving power generated by the motor 500 have a first boost ratio ①, and the first boost ratio ① may be measured by the first sensor 160 and the second sensor 560 and required to design the electric booster according to the present invention. For example, when the first boost ratio ① is 9 and the pedal effort applied to the brake pedal is 1, the driving power generated by the motor is 9.

However, the pedal effort applied to the brake pedal and the driving power generated by the motor 500 are unable to have the first boost ratio ① when the pressure outside the master cylinder 310 connected through the fourth connecting flow path 354 is increased or decreased and transmitted into the master cylinder 310. In particular, the master piston 230 moves a distance less than or greater than a distance calculated based on the first boost ratio ①. Therefore, the pedal effort applied to the brake pedal needs to be increased or decreased to generate a braking force desired by the driver.

When the pedal effort applied to the brake pedal and the driving power generated by the motor 500 is unable have the first boost ratio ①, the electric booster having the force-feedback-control structure according to the present invention may maintain the first boost ratio ① by changing the pedal effort applied to the brake pedal and thus, the deformed pressure balancing member 240 may maintain an original shape.

Hereinafter, a state in which the pressure balancing member is deformed by the pressure applied to the first contact surface or the second contact surface and a process of designing the pressure balancing member will be described with reference to FIGS. 3 and 4A to 4C.

Figure 3:
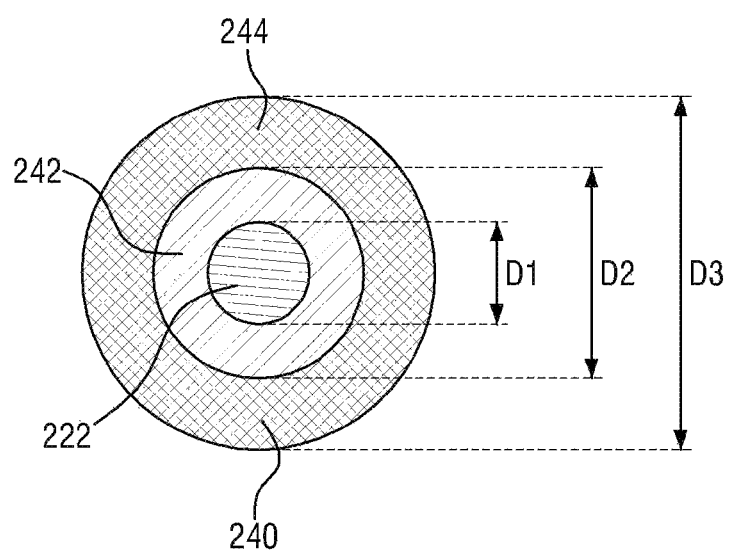
FIG. 3 is a view illustrating a surface of a cross section of a pressure balancing member to which a pressure is applied according to an exemplary embodiment of the present invention.

Referring to FIG. 3, in the cross section of the pressure balancing member 240, an area of the first contact surface 242 is a difference between a cross-sectional area of the vertical portion 224 and a cross-sectional area of the horizontal portion 222. In particular, a difference between the cross-sectional area calculated based on a diameter D2 of the vertical portion 224 and the cross-sectional area calculated based on a diameter D1 of the horizontal portion 222 may be calculated using a formula for calculating an area of a circle. In addition, in the cross section of the pressure balancing member 240, an area of the second contact surface 244 is a difference between a cross-sectional area of the pressure balancing member 240 and a cross-sectional area of the vertical portion 224. In other words, a difference between a cross-sectional area calculated based on a diameter D3 of the pressure balancing member 240 and the cross-sectional area calculated based on the diameter D2 of the vertical portion 224 may be calculated using a formula for calculating an area of a circle.

A pressure P1 applied to the first contact surface 242 may be expressed as a force applied to the area of the first contact surface 242, and the pressure P1 is equal to a force applied to the area of the horizontal portion 222 from the hydraulic pressure which is formed in the separation space SP. In addition, the hydraulic pressure formed in the separation space SP is equal to a pressure transmitted through the second connecting flow path 152 and the supply flow path 280 from the pedal effort which may be applied to the brake pedal. Therefore, the pressure P1 applied to the first contact surface 242 may be generated from the pedal effort applied to the brake pedal.

A pressure P2 applied to the second contact surface 244 may be expressed as a force applied to the area of the second contact surface 244, and the pressure P2 is equal to a reaction force transmitted to the connecting member 260 as the nut unit 270 is moved forward by the motor 500. Therefore, the pressure P2 applied to the second contact surface 244 may be generated from the driving power generated by the motor 500.

Figure 4A:
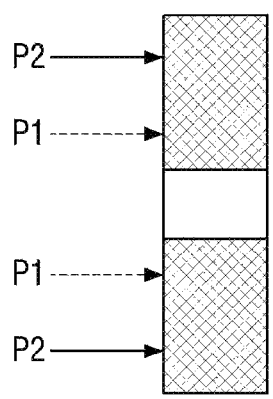
FIG. 4A is a view illustrating a state of the pressure balancing member when a pressure applied to a first contact surface and a pressure applied to a second contact surface are equal to each other according to an exemplary embodiment of the present invention.

Referring to FIG. 4A, when the pressure P1 applied to the first contact surface 242 and the pressure P2 applied to the second contact surface 244 are equal to each other, the cross section of the pressure balancing member 240 may be maintained in a flat state. This state is referred to as a normal state. The pressure balancing member 240 may be designed such that P1 and P2 are equal to each other. In particular, since P1 and P2 have the same value, P1 and P2 define a balancing pressure.

Specifically, assuming that the force applied to the first contact surface 242 is F1 and the force applied to the second contact surface 244 is F2, F1 and F2 may be obtained by the following Calculation Formula 1.

$$F1 = \text{BALANCING PRESSURE} \times \frac{\pi(D2^2 - D1^2)}{4} \quad \text{Calculation Formula 1}$$

$$F2 = \text{BALANCING PRESSURE} \times \frac{\pi(D3^2 - D2^2)}{4}$$

A ratio between F1 and F2 may be obtained by the following Calculation Formula 2.

$$\frac{F2}{F1} = \frac{D3^2 - D2^2}{D2^2 - D1^2} \quad \text{Calculation Formula 2}$$

In particular, assuming that the boost ratio is a ratio between the force applied to the brake pedal and the force generated by the motor, F2/F1 may be referred to as the boost ratio.

Therefore, D1 to D3 of the pressure balancing member 240 may be designed based on the first boost ratio ① required to design the electric booster according to the present invention.

Figure 4B:
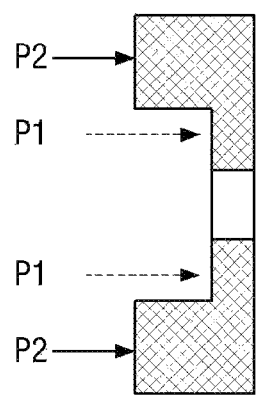
FIG. 4B is a view illustrating a state of the pressure balancing member when a pressure applied to the first contact surface is higher than a pressure applied to the second contact surface according to an exemplary embodiment of the present invention.

Referring to FIG. 4B, when the pressure P1 applied to the first contact surface 242 is greater than the pressure P2 applied to the second contact surface 244, the cross section of the pressure balancing member 240 is in a state in which the first contact surface 242 is further recessed inward in the +X direction than the second contact surface 244. This state may be referred to as an insufficient motor-rotation state.

Figure 4C:
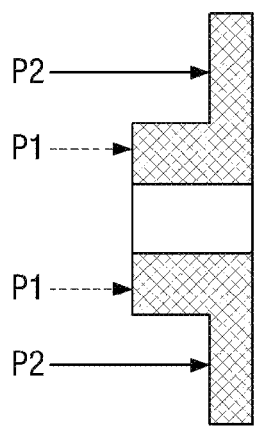
FIG. 4C is a view illustrating a state of the pressure balancing member when a pressure applied to the first contact surface is less than a pressure applied to the second contact surface according to an exemplary embodiment of the present invention.

Referring to FIG. 4C, when the pressure P1 applied to the first contact surface 242 is less than the pressure P2 applied to the second contact surface 244, the cross section of the pressure balancing member 240 is in a state in which the second contact surface 244 protrudes further outward in the −X direction than the first contact surface 242. This state is referred to as an excessive motor-rotation state.

Hereinafter, an operating process of the electric booster having the force-feedback-control structure according to the present invention in the state in which the pedal effort applied to the brake pedal and the force generated by the motor are not equal to each other will be described with reference to FIGS. 5 to 7.

Figure 5:
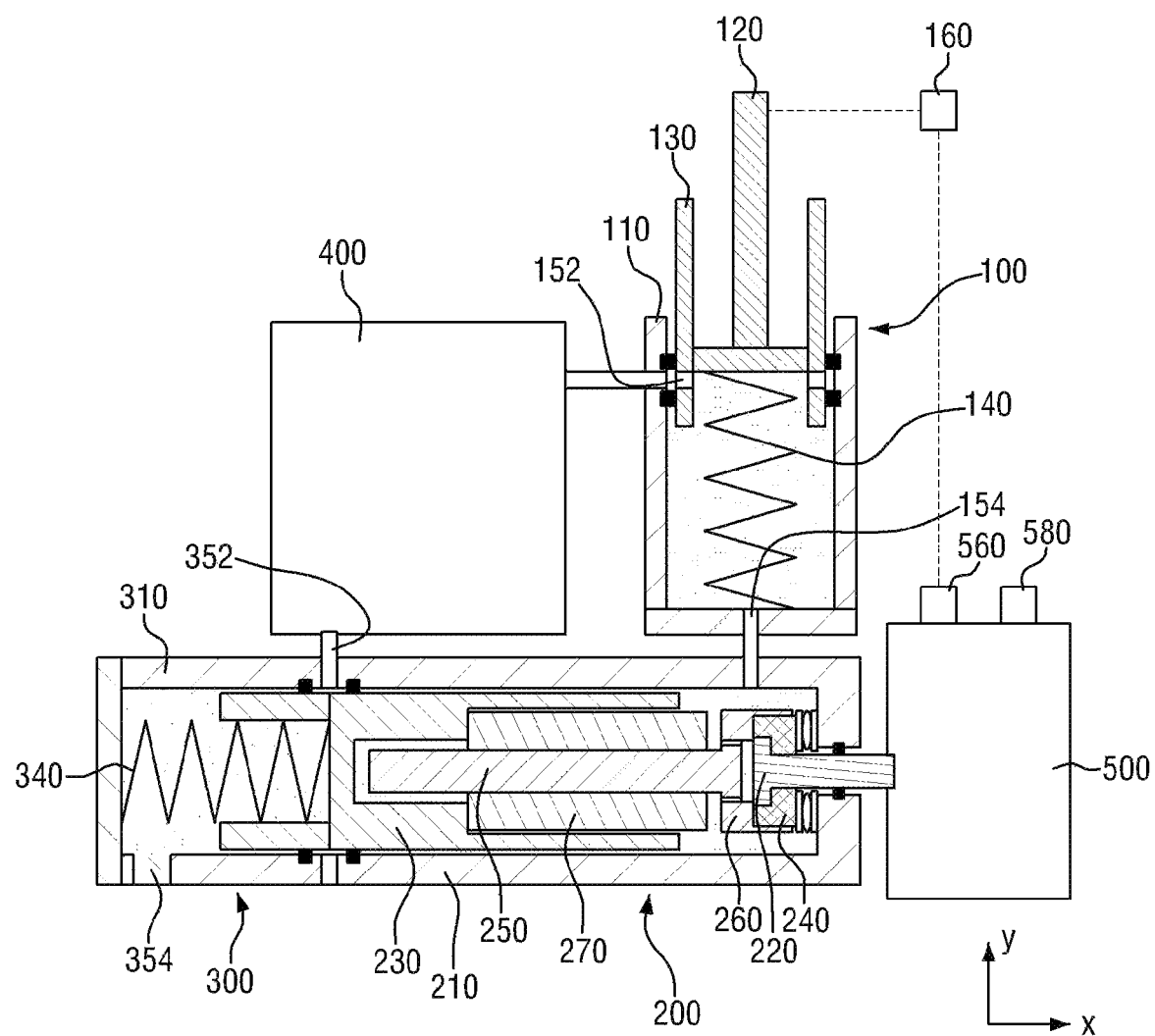
FIG. 5 is a view illustrating a state in which a pedal effort applied to a brake pedal is higher than a force generated by a motor in FIG. 1 according to an exemplary embodiment of the present invention.

Referring to FIG. 5, when rigidity of a brake caliper or the like is increased, the force (e.g., driving power) generated by the motor 500 is insufficiently applied in comparison with the pedal effort applied to the brake pedal. Therefore, since the pressure P1 applied to the first contact surface 242 is greater than the pressure P2 applied to the second contact surface 244, the pressure balancing member 240 is in the insufficient motor-rotation state, and the first screw 220 is moved in the +X direction by the pressure difference. Then, since the pressure in the separation space SP is decreased, the second screw 250 and the master piston 230 are moved in the +X direction by the elastic restoring force of the second return spring 340. In other words, based on a second boost ratio ② being less than the first boost ratio ①, the master piston 230 moves a distance that is less than the distance in the −X direction calculated in the normal state.

When the pedal effort applied to the brake pedal is increased in this state, the motor 500 rotates in a first direction based on the measurement of the first sensor 160 and the measurement of the second sensor 560, and thus, the first screw 220 and the second screw 250 rotate to move the master piston 230 in the +X direction. Then, the pressure balancing member 240 may return to the normal state from the insufficient motor-rotation state, and the second boost ratio ② may be changed to the first boost ratio ①.

Figure 6:
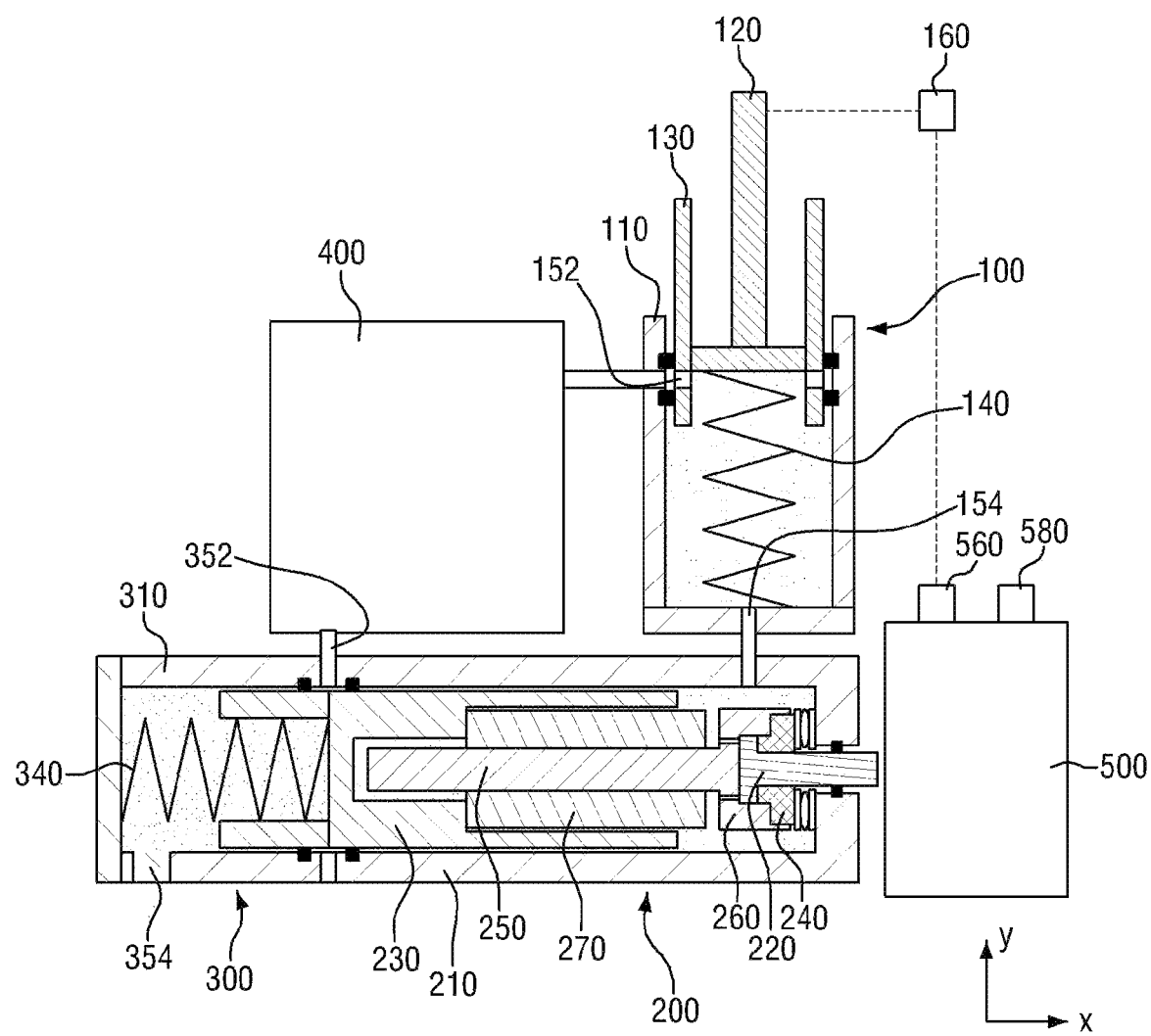
FIG. 6 is a view illustrating a state in which a pedal effort applied to the brake pedal is lower than a force generated by the motor in FIG. 1 according to an exemplary embodiment of the present invention.

Referring to FIG. 6, when rigidity of the brake caliper or the like is decreased, the force (e.g., driving power) generated by the motor 500 may be excessively applied in comparison with the pedal effort applied to the brake pedal. Therefore, since the pressure P1 applied to the first contact surface 242 is less than the pressure P2 applied to the second contact surface 244, the pressure balancing member 240 is in the excessive motor-rotation state, and the first screw 220 is moved in the −X direction by the pressure difference. Then, since the pressure in the separation space SP is increased, the second screw 250 and the master piston 230 move in the −X direction while overcoming the elastic restoring force of the second return spring 340. In other words, based on a third boost ratio ③ being greater than the first boost ratio ①, the master piston 230 moves a distance that is greater than the distance in the −X direction calculated in the normal state.

When the pedal effort applied to the brake pedal is decreased in this state, the motor 500 rotates in a second direction based on the measurement of the first sensor 160 and the measurement of the second sensor 560, and thus, the first screw 220 and the second screw 250 rotate to move the master piston 230 in the −X direction. Then, the pressure balancing member 240 may return to the normal state from the excessive motor-rotation state, and the third boost ratio ③ may be changed to the first boost ratio ①.

Figure 7:
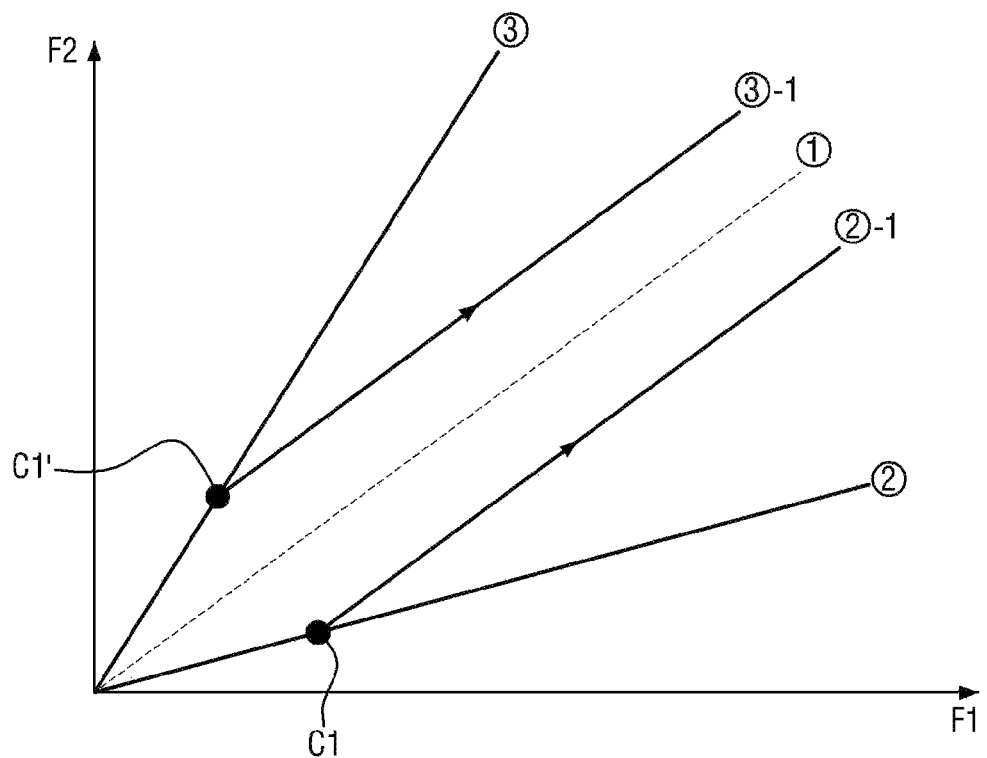
FIG. 7 is a view illustrating a boost ratio which is a relationship between the pedal effort applied to the brake pedal and the force generated by the motor according to an exemplary embodiment of the present invention.

FIG. 7 is a view illustrating a boost ratio, in which the X axis indicates the pedal effort F1 applied to the brake pedal, and the Y axis indicates the force F2 generated by the motor. The first boost ratio ① may be implemented when the pressure balancing member 240 is in the normal state, the second boost ratio ② may be implemented when the pressure balancing member 240 is in the insufficient motor-rotation state, and the third boost ratio ③ may be implemented when the pressure balancing member 240 is in the excessive motor-rotation state.

When the pressure balancing member 240 is in the insufficient motor-rotation state, the second boost ratio ② may be changed to a boost ratio ②-1 having the same gradient as the first boost ratio ① at a point in time C1 at which the pedal effort applied to the brake pedal is increased. In addition, when the pressure balancing member 240 is in the excessive motor-rotation state, the third boost ratio ③ may be changed to a boost ratio ③-1 having the same gradient as the first boost ratio ① at a point in time C1' at which the pedal effort applied to the brake pedal is decreased.

Meanwhile, the electric booster having the force-feedback-control structure according to the present invention may further include a third sensor 580. The third sensor 580 may be configured to measure a movement displacement of the first screw 220 based on the state of the pressure balancing member 240 in the normal state when the pressure balancing member 240 is deformed by the movement of the first screw 220. An output voltage of the third sensor 580 rotates the motor 500 to move the first screw 220 in the direction opposite to the movement displacement of the first screw 220.

Specifically, when the first screw 220 is moved in the −X direction in the insufficient motor-rotation state, the third sensor 580 may be configured to measure the movement displacement of the first screw 220, and the motor 500 may rotate in a first direction to move the first screw 220 in the +X direction by the changed distance. In addition, when the first screw 220 is moved in the +X direction in the excessive motor-rotation state, the third sensor 580 may be configured to measure the movement displacement of the first screw 220, and the motor 500 may rotate in the second direction to move the first screw 220 in the −X direction by the changed distance. When the third sensor 580 is in the insufficient motor-rotation state or the excessive motor-rotation state, the pressure balancing member 240 may return to the normal state without changing the pedal effort applied to the brake pedal.

Figure 8:
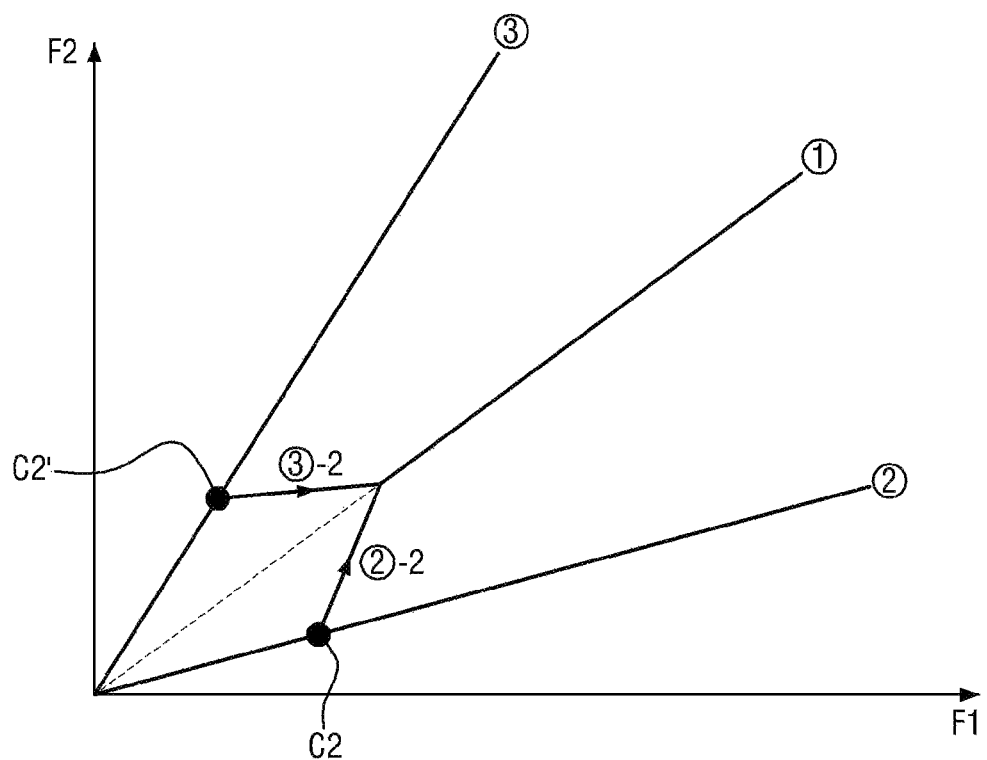
FIG. 8 is a view illustrating a boost ratio which is a relationship between the pedal effort applied to the brake pedal and the force generated by the motor when there is a third sensor according to an exemplary embodiment of the present invention.

Referring to FIG. 8, when the pressure balancing member 240 is in the insufficient motor-rotation state, the second boost ratio ② has a large gradient ②-2 and increases at the point in time C2 at which the output voltage of the third sensor 580 is generated, and the gradient of the second boost ratio ② becomes equal to the gradient of the first boost ratio ① when the pressure balancing member reaches the normal state. In addition, when the pressure balancing member 240 is in the excessive motor-rotation state, the third boost ratio ③ has a small gradient and decreases at a point in time CT at which the output voltage of the third sensor 580 is generated, and the gradient of the third boost ratio ③ becomes equal to the gradient of the first boost ratio ① when the pressure balancing member 240 reaches the normal state.

In other words, with the third sensor 580, the motor 500 may rotate to compensate for a difference in boost ratio between the insufficient motor-rotation state or the excessive motor-rotation state and the normal state, and as a result, it may be possible to more accurately operate the electric booster and minimize non-uniformity in braking in comparison with a case in which there is no third sensor 580.

Meanwhile, in the electric booster having the force-feedback-control structure according to the exemplary embodiment of the present invention, the first sensor 160, the second sensor 560, and the third sensor 580 may be connected to a separate controller (not illustrated) such as an electric control unit (ECU), and the motor 500 may be rotated based on a signal from the controller (not illustrated).

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. An electric booster having a force-feedback-control structure, comprising:
    a master piston including a nut unit;
    a boosting cylinder having a space in which the master piston is rectilinearly moved by receiving driving power generated by a motor and a hydraulic pressure generated by a pedal effort applied to a brake pedal;

a first screw having a first end connected to the motor and a second end extending into the boosting cylinder, wherein the first screw is rotated by the motor that operates in conjunction with the brake pedal;

a second screw disposed to face the first screw to have a separation space and thread-coupled to the nut unit;

a connecting member which connects the first screw and the second screw; and a pressure balancing member disposed to have contact surfaces in contact with the second end of the first screw and the connecting member, respectively, and deformed by a difference between two pressures when the two pressures are applied to the contact surfaces in a longitudinal direction of the first screw, respectively.

2. The electric booster of claim 1, wherein the first screw has a horizontal portion which is formed in the longitudinal direction, and a vertical portion which extends from the second end of the first screw in a direction perpendicular to the horizontal portion.

3. The electric booster of claim 2, wherein the pressure balancing member has a greater size than the vertical portion and has a smaller size than the connecting member.

4. The electric booster of claim 2, wherein the contact surface of the pressure balancing member, which is in contact with the vertical portion, is a first contact surface corresponding to a part of a cross section of the vertical portion except for a cross section of the horizontal portion, and the contact surface of the pressure balancing member, which is in contact with the connecting member, is a second contact surface corresponding to a part of a cross section of the pressure balancing member except for the cross section of the vertical portion.

5. The electric booster of claim 4, wherein a pressure applied to the first contact surface in the longitudinal direction of the first screw and a pressure applied to the second contact surface are equal to each other.

6. The electric booster of claim 4, wherein a pressure applied to the first contact surface is equal to a pressure of a hydraulic fluid provided in the separation space which is applied to a cross section of the horizontal portion.

7. The electric booster of claim 1, wherein a first side surface of the pressure balancing member, as the contact surface, is in contact with the second end of the first screw such that the pressure balancing member operates together with the first screw, and a second side surface of the pressure balancing member is positioned to be stationary.

8. The electric booster of claim 1, wherein a flow path is formed in the connecting member to supply a hydraulic fluid to the separation space.

9. The electric booster of claim 1, further comprising:

a first sensor configured to measure a displacement of the brake pedal; and a second sensor configured to measure a rotation angle of the motor, wherein the first sensor and the second sensor operate in conjunction with each other.

10. The electric booster of claim 1, wherein when the two pressures applied to the contact surfaces are different from each other, the pedal effort applied to the brake pedal is changed to rotate the motor.

11. The electric booster of claim 1, further comprising:

a third sensor configured to measure a displacement of the first screw, wherein the motor is rotated based on a measured value of the third sensor when the first screw is displaced as the two pressures applied to the contact surfaces are different from each other.

12. The electric booster of claim 1, wherein a master cylinder having a space in which a braking pressure is formed by a movement of the master piston, is provided at one side of the boosting cylinder.

* * * * *